US012770567B2

(12) United States Patent
Huang et al.

(10) Patent No.: US 12,770,567 B2
(45) Date of Patent: Oct. 20, 2026

(54) DISPLAY PANEL AND DISPLAY DEVICE

(71) Applicant: HKC CORPORATION LIMITED, Shenzhen (CN)

(72) Inventors: Gu Huang, Shenzhen (CN); Haijiang Yuan, Shenzhen (CN)

(73) Assignee: HKC CORPORATION LIMITED, Shenzhen (CN)

( * ) Notice: Subject to any disclaimer, the term of this patent is extended or adjusted under 35 U.S.C. 154(b) by 0 days.

(21) Appl. No.: 19/231,916

(22) Filed: Jun. 9, 2025

(65) Prior Publication Data

US 2025/0384836 A1 Dec. 18, 2025

(30) Foreign Application Priority Data

Jun. 12, 2024 (CN) ......................... 202410751594.3

(51) Int. Cl.
*G09G 3/3233* (2016.01)

(52) U.S. Cl.
CPC ... *G09G 3/3233* (2013.01); *G09G 2300/0819* (2013.01); *G09G 2300/0852* (2013.01); *G09G 2320/0209* (2013.01); *G09G 2320/0233* (2013.01)

(58) Field of Classification Search
None
See application file for complete search history.

(56) References Cited

U.S. PATENT DOCUMENTS

| | | | | |
|---|---|---|---|---|
| 6,091,203 A * | 7/2000 | Kawashima | G09G 3/3241 | 345/55 |
| 2012/0105390 A1 | 5/2012 | Kim et al. | | |
| 2016/0204165 A1* | 7/2016 | Yang | G06F 3/04184 | 345/174 |
| 2019/0325823 A1* | 10/2019 | Yang | G09G 3/3233 | |
| 2021/0358390 A1* | 11/2021 | Yue | G09G 3/32 | |

FOREIGN PATENT DOCUMENTS

| | | | |
|---|---|---|---|
| CN | 104112427 A | 10/2014 | |
| CN | 108877664 A | 11/2018 | |
| CN | 114724516 A * | 7/2022 | G09G 3/3233 |
| CN | 115862537 A | 3/2023 | |
| CN | 116486733 A | 7/2023 | |
| CN | 117542307 A | 2/2024 | |

OTHER PUBLICATIONS

The first office action issued in corresponding CN application No. 202410751594.3 dated Jul. 19, 2024.

* cited by examiner

*Primary Examiner* — Kenneth Bukowski

(74) *Attorney, Agent, or Firm* — HAUPTMAN HAM, LLP

(57) ABSTRACT

A display panel and a display device are provided. The display panel includes multiple pixel units arranged in an array, and the multiple of pixel units each are configured to execute image display according to a received data signal. Each of the plurality of pixel units includes at least two driving modules and at least one light-emitting module, the at least two driving modules are electrically connected to the at least one light-emitting module, respectively, and are configured to simultaneously receive the data signal and respectively provide corresponding driving current to the at least one light-emitting module, to drive the light-emitting module to emit light for image display.

12 Claims, 7 Drawing Sheets

| | | | |
|---|---|---|---|
| 100 | 80 | 60 | 40 |
| 100 | 80 | 60 | 40 |
| 100 | 80 | 60 | 40 |
| 100 | 80 | 60 | 40 |

| | | | |
|---|---|---|---|
| 1 | 1.25 | 1.67 | 2.5 |
| 1 | 1.25 | 1.67 | 2.5 |
| 1 | 1.25 | 1.67 | 2.5 |
| 1 | 1.25 | 1.67 | 2.5 |

PROPORTIONALITY COEFFICIENT TABLE

| | | | |
|---|---|---|---|
| 100 | 100 | 100 | 100 |
| 100 | 100 | 100 | 100 |
| 100 | 100 | 100 | 100 |
| 100 | 100 | 100 | 100 |

FIG. 11

DISPLAY PANEL AND DISPLAY DEVICE

CROSS-REFERENCE TO RELATED APPLICATIONS

This application claims priority to Chinese Patent Application No. 202410751594.3, filed Jun. 12, 2024, the entire disclosure of which is incorporated herein by reference.

TECHNICAL FIELD

This disclosure relates to the field of display technology, and in particular to a display panel and a display device.

BACKGROUND

An organic light-emitting diode (OLED) display device has the advantages of self-illumination, low driving current, high luminous efficiency, short response time, high clarity and contrast, a viewing angle close to 180° C., a wide temperature range for application, and flexible display and large-area full-color display, etc., and is considered to be the most promising display device in the industry. However, since the light-emitting material of the OLED is driven by a current to emit light, as panel sizes increase, in order to reduce the heating of the large-size OLED panel, the current for driving the light-emitting material of the OLED needs to be as small as possible, and in this case, the transistor for controlling the driving current is likely to have characteristic drifts (threshold voltage drift and the like) which lead to inconsistent driving current passing through the transistor under the control of the same data voltage, which results in different luminous intensities of the OLED, and leads to a crosstalk phenomenon of uneven brightness in the display panel.

Therefore, how to reduce the crosstalk phenomenon caused by the characteristic drift of the transistor is an urgent problem to be solved.

SUMMARY

Embodiments of the present disclosure provide a display panel. The display panel includes multiple pixel units arranged in an array, and the multiple pixel units each are configured to execute image display according to a received data signal. Each of the multiple pixel units includes at least two driving modules and at least one light-emitting module, the at least two driving modules are electrically connected to the at least one light-emitting module, respectively, and are configured to simultaneously receive the data signal and respectively provide corresponding driving current to the at least one light-emitting module, to drive the at least one light-emitting module to emit light for image display.

Embodiments of the present disclosure further provide a display device. The display device includes a power module and a display panel, and the power module is configured to supply driving power for the display panel to drive the display panel to execute image display. The display panel includes multiple pixel units arranged in an array, and the multiple pixel units each are configured to execute image display according to a received data signal. Each of the multiple pixel units includes at least two driving modules and at least one light-emitting module, the at least two driving modules are electrically connected to the at least one light-emitting module, respectively, and are configured to simultaneously receive the data signal and respectively provide corresponding driving current to the at least one light-emitting module, to drive the at least one light-emitting module to emit light for image display.

BRIEF DESCRIPTION OF THE DRAWINGS

To describe technical solutions of embodiments of the present disclosure more clearly, the following will give a brief introduction to accompanying drawings used for describing embodiments. Apparently, the accompanying drawings hereinafter described are some embodiments of the disclosure. Based on these drawings, those of ordinary skill in the art can also obtain other drawings without creative effort.

FIG. 11 is a schematic diagram illustrating brightness adjustment of a pixel unit provided by an embodiment of the present disclosure.

Figure 1:
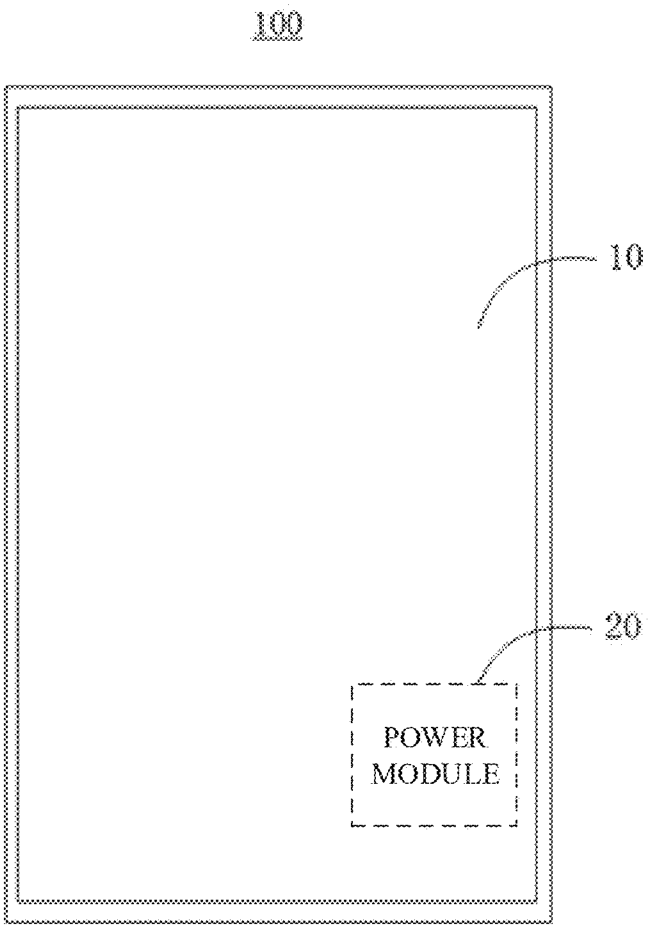
FIG. 1 is a schematic structural diagram of a structure of a display device provided by an embodiment of the present disclosure.

Display device—100, display panel—10, power module—20, display region—10*a*, array substrate—10*c*, *m* data lines—S1-Sm, n scan lines—G1-Gn, first direction—F1, second direction—F2, timing control circuit—11, data driving circuit—12, scan driving circuit—13, pixel unit—15, first switch transistor—T1, second switch transistor—T2, storage capacitor—C, scan line—G, data line—S, light-emitting element—E, signal receiving module—151, first driving module—152*a*, second driving module—152*b*, third driving module—152*c*, fourth driving module—152*d*, light-emitting module—153, first light-emitting module—153*a*, second light-emitting module—153*b*, third light-emitting module—153*c*, fourth light-emitting module—153*d*, first control transistor—M1, second control transistor—M2, third control transistor—M3, fourth light-emitting element—E, second light-emitting element—E, third storage capacitor—M4, second light-emitting element—E, third storage capacitor—E3, fourth light-emitting element—E, first low-voltage terminal—V1, second low-voltage terminal—V3, second low-voltage terminal—V1, second low-voltage terminal—V2

DETAILED DESCRIPTION

In order to facilitate understanding of the present disclosure, a detailed description will now be given with reference to relevant accompanying drawings. The accompanying drawings illustrate some examples of implementations of the present disclosure. However, the present disclosure can be implemented in many different forms and is not limited to the implementations described herein. On the contrary, these embodiments are provided for a more thorough and comprehensive understanding of the present disclosure.

The following description of the embodiments refers to the accompanying drawings to illustrate specific embodiments of the present application. Sequential references assigned to components in the description, such as "first". "second", etc., are used merely to distinguish between described objects and do not have any ordinal or technical meaning. However, the expressions "connected" and "coupled" in the present disclosure, unless otherwise specified, both include direct connection and indirect connection. Directional terms mentioned in the present disclosure, for example, "upper", "lower", "front", "rear", "left", "right", "inner", "outer", "side", or the like are only directions with reference to the accompanying drawings, and therefore, the directional terms are used for better and clearer illustration and understanding of the present disclosure, rather than indicate or imply that the indicated device or element must have a particular orientation or be constructed and operated in a particular orientation. Therefore, it cannot be understood that the present disclosure is limited thereto.

In description of the present disclosure, it should be noted that, unless stated otherwise, terms "installing", "coupling", and "connecting" referred to herein should be understood in broader sense. For example, they may include a fixed coupling, a removable coupling, or an integrated coupling; they may include a mechanical coupling or an electrical coupling; they may include a direct coupling, an indirect coupling through a medium, or an interconnection between two components, or an interaction coupling between two components. For those of ordinary skill in the art, the above terms in the present disclosure can be understood according to specific situations. The terms "first", "second", and the like used in the specification, the claims, and the accompany drawings of the disclosure are used to distinguish different objects rather than describe a particular order.

Additionally, as used herein, the term "comprising", "may include", "including", or "may include" indicates the existence of corresponding functions, operations, elements, etc. that are disclosed, and does not limit one or more other functions, operations, elements, etc. In addition, the terms "comprise" or "include" means that there are corresponding features, numbers, steps, operations, elements, components, or a combination thereof disclosed in the description, and do not exclude the presence or addition of one or more other features, numbers, steps, operations, elements, components, or a combination thereof, and are intended to cover a non-exclusive inclusion. In addition, when describing embodiments of the present disclosure, "can" is used to mean "one or more embodiments of the present disclosure". Also, the term "exemplary" is intended to mean examples or illustrations.

Unless otherwise defined, all technical and scientific terms used herein have the same meaning as commonly understood by those skilled in the art of the present disclosure. The terms used herein in the disclosure are for the purpose of describing implementations only and are not intended to limit the disclosure.

Reference is made to FIG. 1, which is a schematic structural diagram of a display device 100 provided by an embodiment of the present disclosure. The display device 100 includes a display panel 10 and a power module 20, with the power module 20 disposed on the backside of the display panel 10, i.e., the non-display surface of the display panel 10. The power module 20 is configured to provide driving current for image display on the display panel 10.

Figure 2:
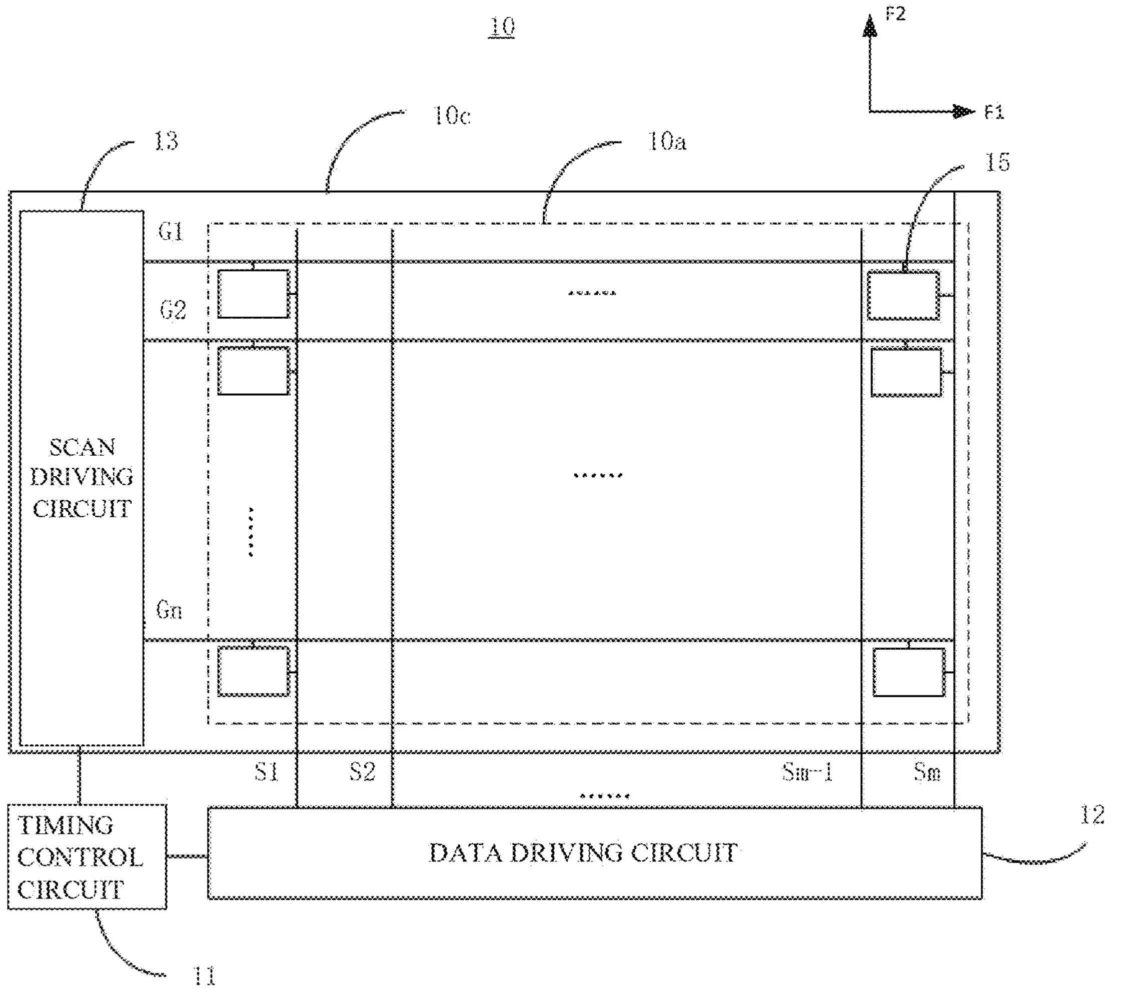
FIG. 2 is a planar layout schematic diagram of the display panel in FIG. 1.

Reference is made to FIG. 2, which is a planar layout schematic diagram of the display panel in FIG. 1.

As illustrated in FIG. 2, the display region 10*a* of the display panel 10 includes multiple pixel units 15 arranged in a matrix, m data lines S1-Sm, and n scan lines G1-Gn, where m and n are natural numbers greater than 1.

The n scan lines G1-Gn each extend along a first direction F1 and are arranged parallel to each other along a second direction F2 in an insulated manner. The m data lines S1-Sm extend along the second direction F2 and are arranged parallel to each other along the first direction F1 in an insulated manner. The first direction F1 and the second direction F2 are perpendicular to each other.

The display panel 10 further includes, in the non-display region, a timing control circuit 11 for driving the pixel units to execute image display, a data driving circuit 12, and a scan driving circuit 13 disposed on the array substrate 10*c*.

The timing control circuit 11 is electrically connected to the data driving circuit 12 and the scan driving circuit 13 and is configured to control the operation timing of the data driving circuit 12 and the scan driving circuit 13, i.e., to output corresponding timing light-emitting signals to the data driving circuit 12 and the scan driving circuit 13 to control when to output corresponding scan signals and data signals.

The data driving circuit 12 is electrically connected to the m data lines S1-Sm and is configured to transmit data signals (Data) for display to the multiple pixel units 15 in the form of data voltages through the m data lines S1-Sm.

The scan driving circuit 13 is electrically connected to the n scan lines G1-Gn and is configured to output scan signals through the n scan lines G1-Gn to control when the pixel units 15 receive the data signals. The scan driving circuit 13 sequentially outputs scan signals to the scan lines G1, G2, . . . , Gn in accordance with a positional order of the scan lines G1, G2, . . . , Gn and a scan cycle.

Figure 3:
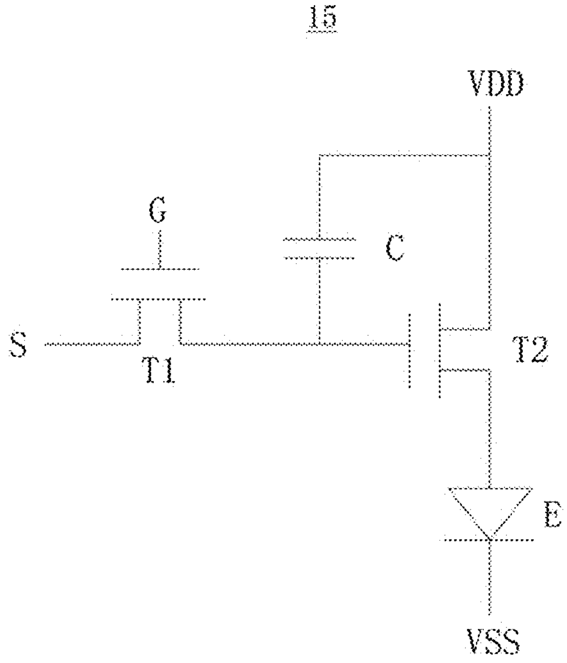
FIG. 3 is a schematic diagram of an equivalent circuit of a pixel unit in FIG. 2.

Reference is made to FIG. 3, which is a schematic diagram of an equivalent circuit of a pixel unit in FIG. 2.

As illustrated in FIG. 3, the pixel unit 15 includes a first switch transistor T1, a second switch transistor T2, a storage capacitor C, and a light-emitting element E. The gate of the first switch transistor T1 is electrically connected to the scan line G, the source of the first switch transistor T1 is electrically connected to the data line S, and the drain of the first switch transistor T1 is electrically connected to the gate of the second switch transistor T2. The source of the second switch transistor T2 is electrically connected to a driving voltage terminal VDD, and the drain of the second switch transistor T2 is electrically connected to the anode of the light-emitting element E. The cathode of the light-emitting element E is electrically connected to a low-voltage terminal VSS, and the storage capacitor C is electrically connected between the gate and source of the second switch transistor T2.

The first switch transistor T1 is turned on under the control of the scan signal to transmitted the data signal to the storage capacitor C for storage. The storage capacitor C controls the conduction of the second switch transistor T2 according to the stored data signal, allowing the driving voltage output from the driving voltage terminal VDD to be transmitted to the light-emitting element E to drive the light-emitting element E to emit light. The magnitude of the voltage in the storage capacitor C is used to control the magnitude of current flowing to the light-emitting element E through the second switch transistor T2. By controlling different currents, the light-emitting element E emits light of varying brightness, enabling the pixel unit 15 to execute image display.

Figure 4:
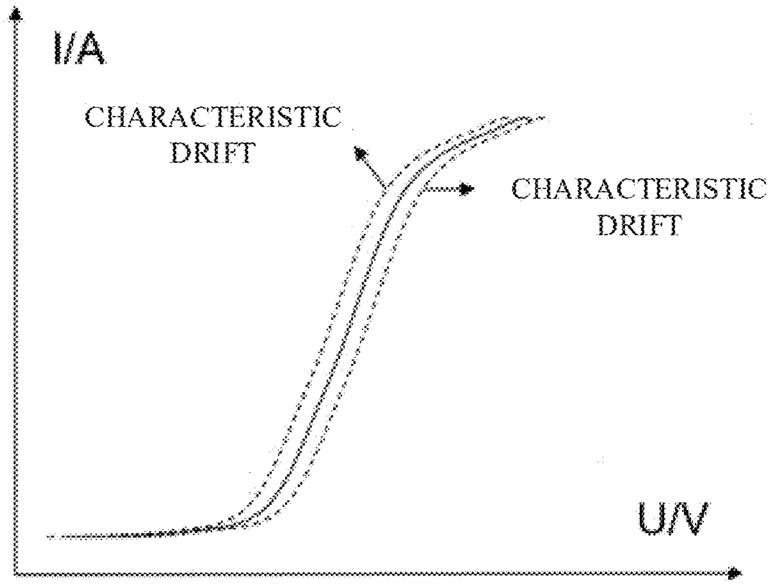
FIG. 4 is a schematic diagram of characteristic drift of a second switch transistor in FIG. 3.

However, as the second switch transistor T2 often exhibits characteristic drift (threshold voltage or threshold current) as illustrated in FIG. 4, the same data voltage in the storage capacitor C may control different currents transmitted to the light-emitting element E, resulting in inconsistent brightness of the light-emitting element E and causing crosstalk in the display panel. To address this, the following embodiments of the present disclosure provide a pixel unit to eliminate crosstalk caused by variations in driving current.

Figure 5:
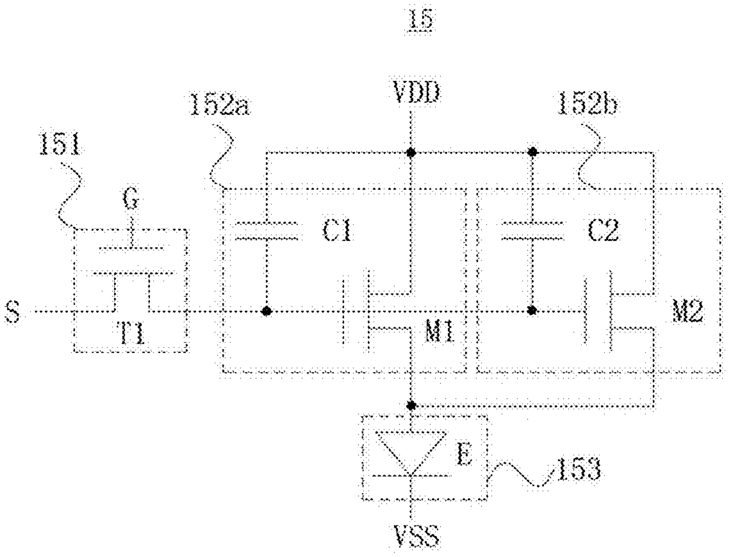
FIG. 5 is a schematic diagram of an equivalent circuit of a pixel unit provided by an embodiment of the present disclosure.

Refer is made to FIG. 5, which is a schematic diagram of an equivalent circuit of a pixel unit provided by an embodiment of the present disclosure.

As illustrated in FIG. 5, the pixel unit 15 includes a signal receiving module 151, a light-emitting module 153, and at least two driving modules 152. The signal receiving module 151 is electrically connected to the data line S and is configured to receive the data signal from the data line S. The driving modules 152 are electrically connected to the driving voltage terminal VDD, the signal receiving module 151, and the light-emitting module 153, and are configured to receive the data signal from the signal receiving module 151 and, according to the data signal, receive driving voltage from the driving voltage terminal VDD to drive the light-emitting module 153 to emit light. The two driving modules 152 simultaneously receive the data signal from the signal receiving module 151 and, according to the data signal, simultaneously receive the driving signal from the driving voltage terminal VDD to drive the light-emitting module 153 to emit light.

For example, the pixel unit 15 includes a first driving module 152*a* and a second driving module 152*b*. The first driving module 152*a* and the second driving module 152*b* are electrically connected to the driving voltage terminal VDD, the signal receiving module 151, and the light-emitting module 153, and are configured to simultaneously receive the data signal from the signal receiving module 151 and, according to the data signal, receive driving voltage from the driving voltage terminal VDD to drive the light-emitting module 153 to emit light.

Specifically, the signal receiving module 151 includes a first switch transistor T1, and the light-emitting module 153 includes a light-emitting element E. The first driving module 152*a* includes a first control transistor M1 and a first storage capacitor C1, while the second driving module 152*b* includes a second control transistor M2 and a second storage capacitor C2. The control terminal of the first switch transistor T1 is electrically connected to the scan line G, the first terminal of the first switch transistor T1 is electrically connected to the data line S, and the second terminal of the first switch transistor T1 is electrically connected to the control terminal of the first control transistor M1 and the control terminal of the second control transistor M2. The first terminal of the first control transistor M1 is electrically connected to the driving voltage terminal VDD, and the second terminal of the first control transistor M1 is electrically connected to the anode of the light-emitting element E. The first terminal of the second control transistor M2 is electrically connected to the driving voltage terminal VDD, and the second terminal of the second control transistor M2 is electrically connected to the anode of the light-emitting element E. The cathode of the light-emitting element E is electrically connected to the low-voltage terminal VSS. The first storage capacitor C1 is electrically connected between the control terminal and the first terminal of the first control transistor M1, and the second storage capacitor C2 is electrically connected between the control terminal and the first terminal of the second control transistor M2.

Since the first control transistor M1 and the second control transistor M2 simultaneously receive driving current to drive the light-emitting element E to emit light, when either the first control transistor M1 or the second control transistor M2 exhibits characteristic drift, the effect of the characteristic drift is shared by the other control transistor. For example, if the first control transistor M1 causes the driving current to decrease due to characteristic drift, the second control transistor M2 can maintain transmission of normal driving current, effectively mitigates situations where the light-emitting element E appears too dim or too bright due to the characteristic drift of the first control transistor M1, which significantly solves the crosstalk issue in the display panel.

Figure 6:
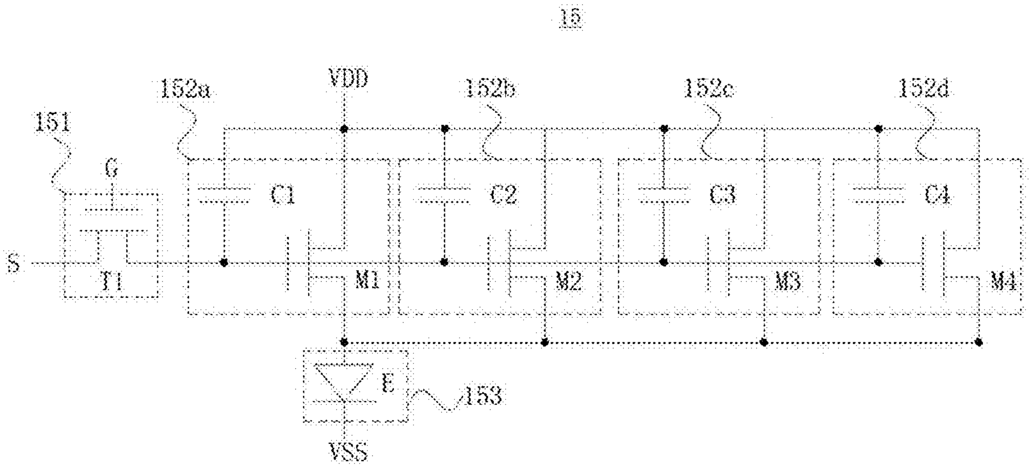
FIG. 6 is a schematic diagram of an equivalent circuit of a pixel unit in another embodiment of FIG. 5.

In an embodiment, the pixel unit 15 may include four driving modules 152, as illustrated in FIG. 6, that is, the pixel unit 15 includes a first driving module 152*a*, a second driving module 152*b*, a third driving module 152*c*, and a fourth driving module 152*d*. The first driving module 152*a* includes a first control transistor M1 and a first storage capacitor C1, the second driving module 152*b* includes a second control transistor M2 and a second storage capacitor C2, the third driving module 152*c* includes a third control transistor M3 and a third storage capacitor C3, and the fourth driving module 152*d* includes a fourth control transistor M4 and a fourth storage capacitor C4.

The first terminal of the first switch transistor T1 is electrically connected to the data line S, and the second terminal of the first switch transistor T1 is electrically connected to the control terminals of the first control transistor M1, the second control transistor M2, the third control transistor M3, and the fourth control transistor M4. The first terminal of the first control transistor M1 is electrically connected to the driving voltage terminal VDD, and the second terminal of the first control transistor M1 is electrically connected to the light-emitting element E. The first terminal of the second control transistor M2 is electrically connected to the driving voltage terminal VDD, and the second terminal of the second control transistor M2 is electrically connected to the light-emitting element E. The first terminal of the third control transistor M3 is electrically connected to the driving voltage terminal VDD, and the second terminal of the third control transistor M3 is electrically connected to the light-emitting element E. The first terminal of the fourth control transistor M4 is electrically connected to the driving voltage terminal VDD, and the second terminal of the fourth control transistor M4 is electrically connected to the light-emitting element E. The first storage capacitor C1 is electrically connected between the control terminal and the first terminal of the first control transistor M1, the second storage capacitor C2 is electrically connected between the control terminal and the first terminal of the second control transistor M2, the third storage capacitor C3 is electrically connected between the control terminal and the first terminal of the third control transistor M3, and the fourth storage capacitor C4 is electrically connected between the control terminal and the first terminal of the fourth control transistor M4.

By connecting the four control transistors (the first control transistor M1, the second control transistor M2, the third control transistor M3, and the fourth control transistor M4) between the driving voltage terminal VDD and the light-emitting element E, the driving current output from the driving voltage terminal VDD is transmitted to the light-emitting element E through the four control transistors to drive the light-emitting element E to emit light. Since the driving current controlled by each transistor is only one-fourth of the total driving current, when any one or more control transistors exhibit characteristic drift, causing the driving current to decrease or increase, the impact on the total driving current is minimized, thereby eliminating crosstalk caused by characteristic drift of the control transistors.

Moreover, if the driving current of one control transistor decreases while the driving current of another control transistor increases, the effects of their characteristic drifts can offset each other, ensuring that the light-emitting element E emits light at the preset brightness. For example, considering only cases where the driving current of the control transistor is either too large or too small, the probability of each control transistor exhibiting a decrease in driving current is ½. Thus, the probability that all four control transistors simultaneously exhibit a decrease in driving current is 1⁄16. Similarly, the probability that all four control transistors exhibit an increase in driving current is 1⁄16. Therefore, the probability that the pixel unit 15 appears either too bright or too dim is 1⁄16+1⁄16=⅛, meaning the probability that the pixel unit 15 maintains normal brightness is ⅞. This significantly reduces the crosstalk in the display panel caused by characteristic drift of the control transistors.

Figure 7:
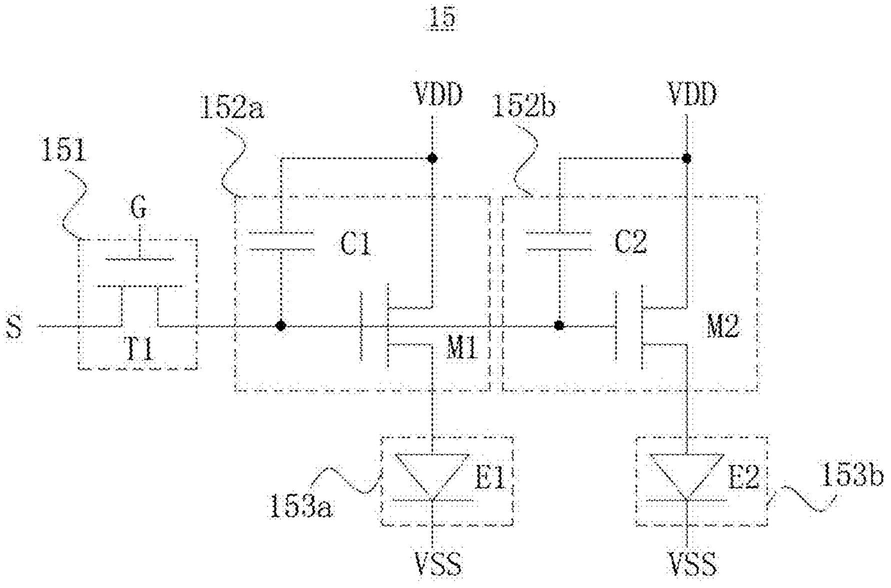
FIG. 7 is a schematic diagram of an equivalent circuit of a pixel unit provided by an embodiment of the present disclosure.

Reference is made to FIG. 7, which is a schematic diagram of an equivalent circuit of a pixel unit provided by an embodiment of the present disclosure.

As illustrated in FIG. 7, the pixel unit 15 includes a signal receiving module 151, at least two light-emitting modules 153, and at least two driving modules 152. The signal receiving module 151 is electrically connected to the data line S and is configured to receive the data signal from the data line S. The multiple light-emitting modules 153 and the multiple driving modules 152 are arranged in a one-to-one correspondence. Each driving module 152 is electrically connected to the driving voltage terminal VDD, the signal receiving module 151, and a corresponding light-emitting module 153, and is configured to receive the data signal from the signal receiving module 151 and, according to the data signal, receive driving voltage from the driving voltage terminal VDD to drive the light-emitting module 153 to emit light.

For example, the pixel unit 15 includes a first driving module 152*a*, a second driving module 152*b*, a first light-emitting module 153*a*, and a second light-emitting module 153*b*. The first driving module 152*a* is electrically connected to the driving voltage terminal VDD, the signal receiving module 151, and the first light-emitting module 153*a*, while the second driving module 152*b* is electrically connected to the driving voltage terminal VDD, the signal receiving module 151, and the second light-emitting module 153*b*. The first driving module 152*a* and the second driving module 152*b* are configured to receive the same data signal from the signal receiving module 151 and respectively drive the first light-emitting module 153*a* and the second light-emitting module 153*b* to emit light simultaneously.

Specifically, the signal receiving module 151 includes a first switch transistor T1. The first driving module 152*a* includes a first control transistor M1 and a first storage capacitor C1, and the second driving module 152*b* includes a second control transistor M2 and a second storage capacitor C2. The first light-emitting module 153*a* includes a first light-emitting element E1, and the second light-emitting module 153*b* includes a second light-emitting element E2. A control terminal of the first switch transistor T1 is electrically connected to the scan line G, a first terminal of the first switch transistor T1 is electrically connected to the data line S, and a second terminal of the first switch transistor T1 is electrically connected to a control terminal of the first control transistor M1 and a control terminal of the second control transistor M2. A first terminal of the first control transistor M1 is electrically connected to the driving voltage terminal VDD, and a second terminal of the first control transistor M1 is electrically connected to an anode of the first light-emitting element E1. A first terminal of the second control transistor M2 is electrically connected to the driving voltage terminal VDD, and a second terminal of the second control transistor M2 is electrically connected to an anode of the second light-emitting element E2. Cathodes of the first light-emitting element E1 and the second light-emitting element E2 are electrically connected to the low-voltage terminal VSS. The first storage capacitor C1 is electrically connected between the control terminal and the first terminal of the first control transistor M1, and the second storage capacitor C2 is electrically connected between the control terminal and the first terminal of the second control transistor M2.

Since the first control transistor M1 and the second control transistor M2 simultaneously receive the same data signal to drive the first light-emitting element E1 and the second light-emitting element E2, respectively, if either the first control transistor M1 or the second control transistor M2 exhibits characteristic drift, causing the first light-emitting element E1 or the second light-emitting element E2 to appear too dim or too bright, the brightness of the two light-emitting elements can balance each other out, effectively reducing inaccuracies in brightness caused by characteristic drift and improving crosstalk in the display panel.

Figure 8:
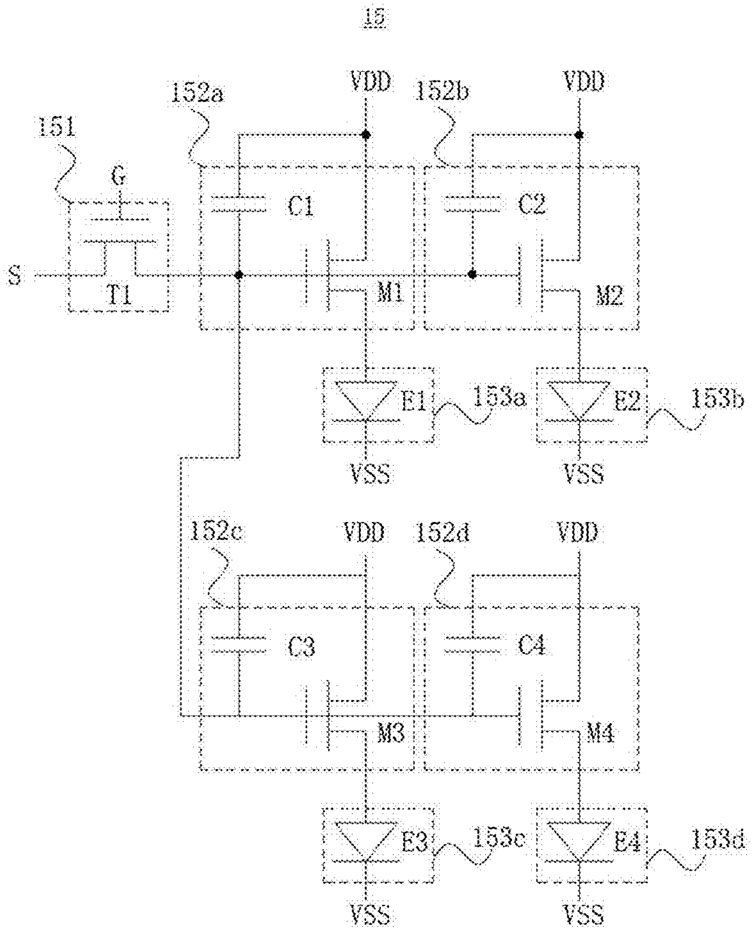
FIG. 8 is a schematic diagram of an equivalent circuit of a pixel unit provided by an embodiment of the present disclosure.

Reference is made to FIG. 8, which is a schematic diagram of an equivalent circuit of a pixel unit provided by an embodiment of the present disclosure.

As illustrated in FIG. 8, the pixel unit 15 may include four driving modules 152 and four corresponding light-emitting modules 153, i.e., a first driving module 152*a*, a second driving module 152*b*, a third driving module 152*c*, a fourth driving module 152*d*, a first light-emitting module 153*a*, a second light-emitting module 153*b*, a third light-emitting module 153*c*, and a fourth light-emitting module 153*d*. The first driving module 152*a*, the second driving module 152*b*, the third driving module 152*c*, and the fourth driving module 152*d* simultaneously receive the same data signal and are configured to drive the first light-emitting module 153*a*, the second light-emitting module 153*b*, the third light-emitting module 153*c*, and the fourth light-emitting module 153*d*, respectively, to emit light simultaneously.

The first light-emitting module 153*a*, the second light-emitting module 153*b*, the third light-emitting module 153*c*, and the fourth light-emitting module 153*d* are arranged in an array. The first light-emitting module 153*a* and the second light-emitting module 153*b* are arranged along the first direction F1, while the third light-emitting module 153*c* and the fourth light-emitting module 153*d* are also arranged along the first direction F1. The first light-emitting module 153*a* and the third light-emitting module 153*c* are arranged along the second direction F2, where the first direction F1 is perpendicular to the second direction F2.

Specifically, the first driving module 152*a* includes a first control transistor M1 and a first storage capacitor C1, the second driving module 152*b* includes a second control transistor M2 and a second storage capacitor C2, the third driving module 152*c* includes a third control transistor M3 and a third storage capacitor C3, and the fourth driving module 152*d* includes a fourth control transistor M4 and a fourth storage capacitor C4. The first light-emitting module 153*a* includes a first light-emitting element E1, the second light-emitting module 153*b* includes a second light-emitting element E2, the third light-emitting module 153*c* includes a third light-emitting element E3, and the fourth light-emitting module 153*d* includes a fourth light-emitting element E4.

In this embodiment, the first control transistor M1, the second control transistor M2, the third control transistor M3, and the fourth control transistor M4 may be N-type MOS transistors, though other types of transistors may also be used depending on specific requirements, which is not limited in this disclosure.

A first terminal of the first switch transistor T1 is electrically connected to the data line S, a second terminal of the first switch transistor T1 is electrically connected to a control terminal of the first control transistor M1, a control terminal of the second control transistor M2, a control terminal of the third control transistor M3 and a control terminal of the fourth control transistor M4. A first terminal of the first control transistor M1 is electrically connected to the driving voltage terminal VDD, and a second terminal of the first control transistor M1 is electrically connected to the first light-emitting element E1. A first terminal of the second control transistor M2 is electrically connected to the driving voltage terminal VDD, and a second terminal of the second control transistor M2 is electrically connected to the second light-emitting element E2. A first terminal of the third control transistor M3 is electrically connected to the driving voltage terminal VDD, and a second terminal of the third control transistor M3 is electrically connected to the third light-emitting element E3. A first terminal of the fourth control line M4 is electrically connected to the driving voltage terminal VDD, and a second terminal of the fourth control line M4 is electrically connected to the fourth light-emitting element E4.

The data signal received by the pixel unit 15 includes a first data sub-signal, a second data sub-signal, a third data sub-signal, and a fourth data sub-signal. The first driving module 152*a* controls the first light-emitting module 153*a* to emit light according to the first data sub-signal. The second driving module 152*b* controls the second light-emitting module 153*b* to emit light according to the second data sub-signal. The third driving module 152*c* controls the third light-emitting module 153*c* to emit light according to the third sub data signal. The fourth driving module 152*d* controls the fourth light-emitting module 153*d* to emit light according to the fourth sub data signal. The first data sub-signal, the second data sub-signal, the third data sub-signal and the fourth data sub-signal are equal.

In another embodiment, the first data sub-signal may be controlled to be equal to the fourth data sub-signal, and the second data sub-signal may be controlled to be equal to the third data sub-signal, where the first data sub-signal is greater than the second data sub-signal. In this way, the first light-emitting module 153*a* and the fourth light-emitting module 153*d* have the same brightness, the second light-emitting module 153*b* and the third light-emitting module 153*c* have the same brightness, and the brightness of the first light-emitting module 153*a* is greater than the brightness of the second light-emitting module 153*b*, and the brightness of the third light-emitting module 153*c* is less than the brightness of the fourth light-emitting module 153*d*.

Considering only cases where the driving current is either too large or too small, the probability of each control transistor exhibiting a decrease or increase in driving current is ½. Only when the first light-emitting module 153*a*, the second light-emitting module 153*b*, the third light-emitting module 153*c* and the fourth light-emitting module 153*d* are all overly bright will the pixel unit 15 become overly bright, with a probability of 1/16. When the brightness of the first light-emitting module 153*a*, the second light-emitting module 153*b*, the third light-emitting module 153*c*, and the fourth light-emitting module 153*d* are all dim, the first light-emitting module 153*a* and the fourth light-emitting module 153*d* are originally relatively bright, in this case, the dim effect of the pixel unit 15 is neutralized, and extreme dim will not occur. When any one or more of the four light-emitting modules is bright or dim, the brightness of the pixel unit 15 will be maintained within a predetermined range due to the neutralization effect of the other remaining light-emitting modules. That is, in the present embodiment, there is only a 1/16 probability that characteristic shift in the control transistor will cause crosstalk issues in the display panel, which corresponds to a 15/16 probability of avoiding crosstalk issues.

Four control transistors respectively drive four light-emitting elements E to emit light at the same time, so that driving current output by the driving voltage terminal VDD is respectively transmitted to the light-emitting elements E via the four control transistors to drive the light-emitting elements E to emit light. Since the driving current controlled by each control transistor only occupies one fourth of the total driving current, i.e., the brightness of light emitted from each light-emitting element E occupies one fourth of the total brightness, when any one or more of the control transistors has characteristic shift causing a change in flowing driving current, and thus causing the brightness of any one of the light-emitting elements E to be dimmer or brighter, due to the sharing effect of the other light-emitting elements E, the total brightness is less affected, thereby eliminating the crosstalk phenomenon caused by the characteristic drift of the control transistor. Furthermore, when the brightness of one light-emitting element E is relatively dim and the brightness of the other light-emitting element E is relatively bright, the brightness variation effect of the two light-emitting elements E is neutralized, so that the brightness emitted from the pixel unit 15 is unchanged.

Figure 9:
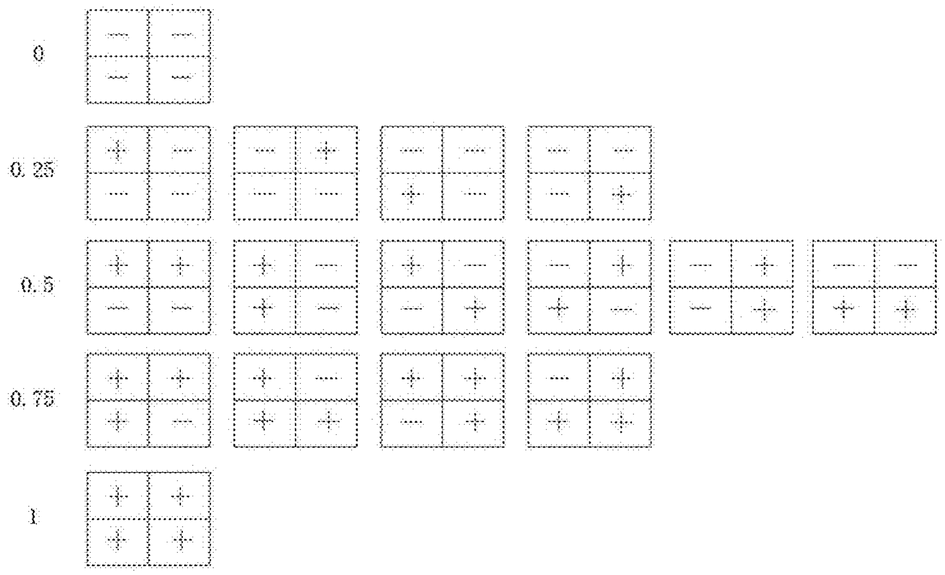
FIG. 9 is a schematic diagram of a combination of brightness variation of the pixel unit in FIG. 8.

Reference is made to FIG. 9, which is a schematic diagram of a combination of brightness variation of the pixel unit in FIG. 8.

The four lattices respectively correspond to the four light-emitting elements E in FIG. 8 in a one-to-one correspondence. Only the situation that the driving current of the control transistor is large or small causing the brightness of the correspondingly connected light-emitting element E to be dimmer and brighter is taken into consideration, where "+" indicates that the light-emitting element E is brighter, greater than a preset brightness, and "–" indicates that the light-emitting "element E is dimmer and less than the preset brightness. When the four light-emitting elements E are denoted by "–", i.e., the four light-emitting elements E are dim at the same time, the mixed brightness is 0 with a probability of 1/16; likewise, the four light-emitting elements E are denoted by "+" at the same time, and the mixed brightness is 1, i.e., the probability of the four light-emitting elements E being brighter at the same time is 1/16.

When one light-emitting element E is dim and the other three light-emitting elements E are normal or brighter, i.e., three "+" and one "–", the brighter light-emitting element E may neutralize the dim light-emitting element E, so that the brightness of the light-emitting element E is shifted toward a preset brightness, and in this case, the mixed brightness is 0.75. When two light-emitting elements E are dim and the other two light-emitting elements E are normal or bright, i.e., two "+" and two "−", the neutralization effect is better, and in this case, the mixed brightness is 0.5. When one light-emitting element E is bright and the other three light-emitting elements E are dim, i.e., three "−", and one "+", the dim light-emitting elements E may neutralize the bright light-emitting elements E, and in this case, the mixed brightness is 0.25. Therefore, the probability of extremely brighter and dimer occurring in the overall brightness of the pixel unit 15 is $\frac{1}{16}+\frac{1}{16}=\frac{1}{8}$, i.e., the probability of normal or slight change of the brightness emitted from the pixel unit 15 is $\frac{7}{8}$, thereby greatly reducing the crosstalk phenomenon of the display panel caused by the characteristic shift of the control transistor.

Figure 10:
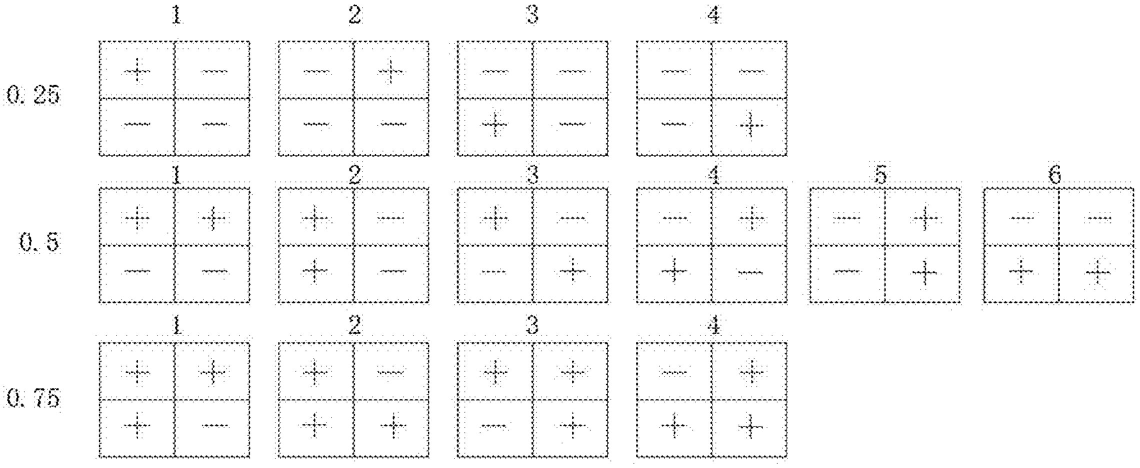
FIG. 10 is a schematic diagram illustrating brightness adjustment of the pixel unit as illustrated in FIG. 8 provided by an embodiment of the present disclosure.

Reference is made to FIG. 10, which a schematic diagram illustrating brightness adjustment of the pixel unit as illustrated in FIG. 8 provided by an embodiment of the present disclosure.

As illustrated in FIG. 10, the brightness of the pixel unit 15 includes a first mixed brightness, a second mixed brightness, and a third mixed brightness, where the first mixed brightness is 0.25, the second mixed brightness is 0.5, and the third mixed brightness is 0.75.

The pixel unit 15 having the first mixed brightness includes four cases, and the pixel units 15 in the four cases are sorted separately. For example, the pixel unit 15 in which the first light-emitting element E1 is brighter ("+") and the second light-emitting element E2 to the fourth light-emitting element E4 are dim ("−") is set as the sequence 1. The pixel unit 15 in which the second light-emitting element E2 is brighter and the first light-emitting element E1, the third light-emitting element E3 and the fourth light-emitting element E4 are dim is set as the sequence 2. By the same reasoning, the pixel unit 15 in which the third light-emitting element E3 is brighter and the remaining light-emitting elements are dim is set as the sequence 3, and the pixel unit 15 in which the fourth light-emitting element E4 is brighter and the remaining light-emitting elements are dim is set as the sequence 4.

The pixel unit 15 having the second mixed brightness includes six cases, and the pixel units 15 in the six cases are sorted separately. For example, the pixel unit 15 in which the first light-emitting element E1 and the second light-emitting element E2 are brighter and the remaining light-emitting elements are dim is set as the sequence 1. The pixel unit 15 in which the first light-emitting element E1 and the fourth light-emitting element E4 are brighter and the remaining light-emitting elements are dim are set as the sequence 2. The pixel unit 15 in which the first light-emitting element E1 and the third light-emitting element E3 are brighter and the remaining light-emitting elements are dim are set as the sequence 3. The pixel unit 15 in which the second light-emitting element E2 and the third light-emitting element E3 are brighter and the remaining light-emitting elements are dim are set as the sequence 4. The pixel unit 15 in which the second light-emitting element E2 and the third light-emitting element E3 are brighter and the remaining light-emitting elements are dim are set as the sequence 5. The pixel unit 15 in which the third light-emitting element E3 and the fourth light-emitting element E4 are brighter and the remaining light-emitting elements are dim are set as be in the sequence 6.

The pixel unit 15 having the third mixed luminance includes four cases, and the pixel units 15 of the four cases are sorted separately. For example, the pixel unit 15 in which the first light-emitting element E1 is dim, and the rest light-emitting elements are brighter is set as the sequence 1. The pixel unit 15 in which the second light-emitting element E2 is dim and the remaining light-emitting elements are brighter is set as the sequence 2. The pixel unit 15 in which the third light-emitting element E3 is dim and the remaining light-emitting elements are brighter is set as the sequence 3. The pixel unit 15 in which the fourth light-emitting element is dim and the remaining light-emitting elements are brighter is set as the sequence 4.

Before each frame of image is displayed, the data driving circuit 12 randomly outputs a sequence number (1 to 6), and controls the pixel units 15 with the same sequence number to emit light, controlling the pixel units with remaining sequence numbers to stop emitting light when the current frame of image is displayed, so that when each frame of image is displayed, the positions of the pixel units 15 which appear overly bright or dim are all different, thereby preventing the pixel units 15 in the display panel from exhibiting regularly dim or brighter. In this way, problems such as a graininess of image display and a shaky line are addressed.

In an exemplary embodiment, it is also possible to control the pixel units 15 with the same sequence number as the number of sequence output from the data driving circuit 12 to be brighter, and control the pixel units 15 with the remaining sequence numbers to be dim, or control the pixel units 15 with the same sequence number as the sequence number output from the data driving circuit 12 to be dim, and control the pixel unit 15 with the remaining sequence numbers to be brighter, so as to prevent the pixel units 15 in the display panel from exhibiting regularly dim or brighter.

Reference is made to FIG. 11, which is a schematic diagram illustrating brightness adjustment of a pixel unit provided by an embodiment of the present disclosure.

As illustrated in FIG. 11, the pixel unit 15 includes at least two light-emitting elements E arranged along a first direction F1, each light-emitting element E is driven to emit light by one corresponding connected driving module 152. When the brightness of the light-emitting modules successively decreases along the first direction F1, the data signals input to adjacent light-emitting elements E are controlled to successively increase along the first direction F1, so as to offset a brightness difference between the adjacent light-emitting elements E. For example, 100 indicates that the brightness emitted by the light-emitting element E is normal, while 80, 60, and 40 indicate different levels of dimness. The pixel unit 15 includes a first light-emitting element E1 and a second light-emitting element E2, and when the light brightness emitted by the first light-emitting element E1 is 100 and the light brightness emitted by the second light-emitting element E2 is 80, the ratio of the magnitude of the data signal transmitted to the first light-emitting element E1 to the magnitude of the data signal transmitted to the second light-emitting element E2 can be controlled to be 1:1.25. When the pixel unit 15 includes four light-emitting elements E, the four light-emitting elements E are arranged in sequence along the first direction F1. Each light-emitting element E is driven to emit light by one corresponding connected driving module 152, and when the brightness of the light-emitting elements E decreases successively along the first direction F1, the data signals input to adjacent light-emitting elements E are controlled to successively increase along the first direction F1 so as to offset a brightness difference between the adjacent light-emitting elements E. For example, the pixel unit 15 includes a first light-emitting element E1, a second light-emitting element E2, a third light-emitting element E3, and a fourth light-emitting element E4. When the light brightness emitted by the first light-emitting element E1 is 100, the light brightness emitted by the second light-emitting element E2 is 80, the light brightness emitted by the third light-emitting element E3 is 60, and the light brightness emitted by the fourth light-emitting element E4 is 40, the ratio of the data signals transmitted to the first to fourth light-emitting elements E1 to E4 is controlled to be 1:1.25:1.67:2.5.

When the pixel unit 15 includes 16 light-emitting elements E, the 16 light-emitting elements E are arranged in a 4×4 array, and each light-emitting element E is driven to emit light by one corresponding connected driving module 152. When the multiple light-emitting elements E in the pixel unit 15 are dim regularly, for example, the brightness of the light-emitting elements E along the first direction F1 sequentially attenuates regularly according to 100, 80, 60 and 40, and in this case, the ratio of the magnitudes of the data signals transmitted to the light-emitting elements E can be controlled to be 1:1.25:1.67:2.5. In other words, the brightness of the light-emitting elements E are adjusted to be restored to normal brightness by respectively controlling the magnitude of the data signal from each driving module.

When the multiple light-emitting elements E in the pixel unit 15 exhibit regular brightness changes, by controlling the data signals transmitted to the light-emitting elements E to change proportionally, the problem of brightness attenuation of the multiple light-emitting elements E in the pixel unit can be effectively eliminated, thereby ensuring the light-emitting brightness of the pixel unit and improving the display effect.

It should be understood that the application of the present disclosure is not limited to the above examples, and those skilled in the art can make improvements or modifications according to the above descriptions, and all these improvements and modifications shall belong to the scope of protection of the appended claims of the present disclosure.

What is claimed is:

1. A display panel, comprising a plurality of pixel units arranged in an array, the plurality of pixel units each being configured to execute image display according to a received data signal, wherein each of the plurality of pixel units comprises a first driving module, a second driving module, a third driving module, a fourth driving module, a first light-emitting module, a second light-emitting module, a third light-emitting module, and a fourth light-emitting module; the first driving module is electrically connected to the first light-emitting module and is configured to drive the first light-emitting module to emit light according to the data signal; the second driving module is electrically connected to the second light-emitting module and is configured to drive the second light-emitting module to emit light; the third driving module is electrically connected to the third light-emitting module and is configured to drive the third light-emitting module to emit light; and the fourth driving module is electrically connected to the fourth light-emitting module and is configured to drive the fourth light-emitting module to emit light;

each of the plurality of pixel units has a first mixed brightness, a second mixed brightness, or a third mixed brightness;

the first mixed brightness is a brightness where among the first light-emitting module to the fourth light-emitting module, one light-emitting module has a brightness greater than a preset brightness, and remaining light-emitting modules each have a brightness less than the preset brightness;

the second mixed brightness is a brightness where among the first light-emitting module to the fourth light-emitting module, two light-emitting modules each have a brightness greater than the preset brightness, and remaining light-emitting modules each have a brightness less than the preset brightness;

the third mixed brightness is a brightness where among the first light-emitting module to the fourth light-emitting module, one light-emitting module has a brightness less than a preset brightness, and remaining light-emitting modules each have a brightness greater than the preset brightness; and when each frame of image is displayed, one of a plurality of pixel units with the first mixed brightness is controlled to emit light, one of a plurality of pixel units with the second mixed brightness is controlled to emit light, and one of a plurality of pixel units with the third mixed brightness is controlled to emit light.

2. The display panel of claim 1, wherein the display panel further comprises a plurality of data lines and a plurality of scan lines, each of the plurality of pixel units further comprises a signal receiving module electrically connected to one of the plurality of data lines and one of the plurality of scan lines, the signal receiving module is configured to receive a scan signal from the one of the plurality of scan lines, receive a data signal from the one of the plurality of data lines under the control of the scan signal, and transmitted the data signal to the first driving module, the second driving module, the third driving module, and the fourth driving module.

3. The display panel of claim 2, wherein the first driving module comprises a first control transistor, the second driving module comprises a second control transistor, the third driving module comprises a third control transistor, and the fourth driving module comprises a fourth control transistor; and a control terminal of the first control transistor is electrically connected to the signal receiving module, a first terminal of the first control transistor is electrically connected to a driving voltage terminal, and a second terminal of the first control transistor is electrically connected to the first light-emitting module; a control terminal of the second control transistor is electrically connected to the signal receiving module, a first terminal of the second control transistor is electrically connected to the driving voltage terminal, and a second terminal of the second control transistor is electrically connected to the second light-emitting module; a control terminal of the third control transistor is electrically connected to the signal receiving module, a first terminal of the third control transistor is electrically connected to the driving voltage terminal, and a second terminal of the third control transistor is electrically connected to the third light-emitting module; and a control terminal of the fourth control transistor is electrically connected to the signal receiving module, a first terminal of the fourth control transistor is electrically connected to the driving voltage terminal, and a second terminal of the fourth control transistor is electrically connected to the fourth light-emitting module.

4. The display panel of claim 1, wherein the first light-emitting module, the second light-emitting module, the third light-emitting module, and the fourth light-emitting module are arranged in an array, the first light-emitting module and the second light-emitting module are arranged along a first direction, and the first light-emitting module and the third light-emitting module are arranged along a second direction, the first direction being perpendicular to the second direction.

5. The display panel of claim 4, wherein among the plurality of pixel units with the first mixed brightness, a pixel unit in which the first light-emitting module has a brightness greater than the preset brightness and remaining light-emitting modules each have a brightness less than the preset brightness is set to correspond to a sequence 1; a pixel unit in which the second light-emitting module has a brightness greater than the preset brightness and remaining light-emitting modules each have a brightness less than the preset brightness is set to correspond to a sequence 2; a pixel unit in which the third light-emitting module has a brightness greater than the preset brightness and remaining light-emitting modules each have a brightness less than the preset brightness is set to correspond to a sequence 3; and a pixel unit in which the fourth light-emitting module have a brightness greater than the preset brightness and remaining light-emitting modules each have a brightness less than the preset brightness is set to correspond to a sequence 4;

among the plurality of pixel units with the second mixed brightness, a pixel unit in which the first light-emitting module and the second light-emitting module each have a brightness greater than the preset brightness and remaining light-emitting modules each have a brightness less than the preset brightness is set to correspond to a sequence 1; a pixel unit in which the first light-emitting module and the fourth light-emitting module each have a brightness greater than a preset brightness and remaining light-emitting modules each have a brightness less than the preset brightness is set to correspond to a sequence 2; a pixel unit in which the first light-emitting module and the third light-emitting module each have a brightness greater than a preset brightness and remaining light-emitting modules each have a brightness less than the preset brightness is set to correspond to a sequence 3; a pixel unit in which the second light-emitting module and the third light-emitting module each have a brightness greater than a preset brightness and remaining light-emitting modules each have a brightness less than the preset brightness is set to correspond to a sequence 4; a pixel unit in which the second light-emitting module and the fourth light-emitting module each have a brightness greater than a preset brightness and remaining light-emitting modules each have a brightness less than the preset brightness is set to correspond to a sequence 5; and a pixel unit in which the third light-emitting module and the fourth light-emitting module each have a brightness greater than a preset brightness and remaining light-emitting modules each have a brightness less than the preset brightness is set to correspond to a sequence 6;

among the plurality of pixel units with the third mixed brightness, a pixel unit in which the first light-emitting module have a brightness less than a preset brightness and remaining light-emitting modules each have a brightness greater than the preset brightness is set to correspond to a sequence 1; a pixel unit in which the second light-emitting module have a brightness less than the preset brightness and remaining light-emitting modules each have a brightness greater than the preset brightness is set to correspond to a sequence 2; a pixel unit in which the third light-emitting module has a brightness less than the preset brightness and remaining light-emitting modules each have a brightness greater than the preset brightness is set to correspond to a sequence 3; and a pixel unit in which the fourth light-emitting module has a brightness less than a preset brightness and remaining light-emitting modules each have a brightness greater than a preset brightness is set to correspond to a sequence 4;

before each frame of image is displayed, any one of the sequence 1 to the sequence 6 is randomly output to control pixel units corresponding to the same sequence to execute image display.

6. The display panel of claim 1, wherein the plurality of pixel units are disposed in a display region of the display panel; the display panel further comprises, in a non-display region of the display panel, a timing control circuit for driving the plurality of pixel units to execute image display, a data driving circuit, and a scan driving circuit; the display panel further comprises a plurality of data lines and a plurality of scan lines;

the timing control circuit is electrically connected to the data driving circuit and configured to control timing of the data driving circuit and the scan driving circuit;

the data driving circuit is electrically connected to the plurality of data lines and is configured to transmit data signals for display to the plurality of pixel units through the plurality of data lines; and the scan driving circuit is electrically connected to the plurality of scan lines and is configured to output scan signals through the plurality of scan lines to control when the plurality of pixel units receive the data signals.

7. A display device, comprising a display panel, the display panel comprising a plurality of pixel units arranged in an array, the plurality of pixel units each being configured to execute image display according to a received data signal, wherein each of the plurality of pixel units comprises a first driving module, a second driving module, a third driving module, a fourth driving module, a first light-emitting module, a second light-emitting module, a third light-emitting module, and a fourth light-emitting module; the first driving module is electrically connected to the first light-emitting module and is configured to drive the first light-emitting module to emit light according to the data signal; the second driving module is electrically connected to the second light-emitting module and is configured to drive the second light-emitting module to emit light; the third driving module is electrically connected to the third light-emitting module and is configured to drive the third light-emitting module to emit light; and the fourth driving module is electrically connected to the fourth light-emitting module and is configured to drive the fourth light-emitting module to emit light;

each of the plurality of pixel units has a first mixed brightness, a second mixed brightness, or a third mixed brightness;

the first mixed brightness is a brightness where among the first light-emitting module to the fourth light-emitting module, one light-emitting module has a brightness greater than a preset brightness, and remaining light-emitting modules each have a brightness less than the preset brightness;

the second mixed brightness is a brightness where among the first light-emitting module to the fourth light-emitting module, two light-emitting modules each have a brightness greater than the preset brightness, and remaining light-emitting modules each have a brightness less than the preset brightness;

the third mixed brightness is a brightness where among the first light-emitting module to the fourth light-emitting module, one light-emitting module has a brightness less than a preset brightness, and remaining light-emitting modules each have a brightness greater than the preset brightness; and when each frame of image is displayed, one of a plurality of pixel units with the first mixed brightness is controlled to emit light, one of a plurality of pixel units with the second mixed brightness is controlled to emit light, and one of a plurality of pixel units with the third mixed brightness is controlled to emit light.

8. The display device of claim 7, wherein the display panel further comprises a plurality of data lines and a plurality of scan lines, each of the plurality of pixel units further comprises a signal receiving module electrically connected to one of the plurality of data lines and one of the plurality of scan lines, the signal receiving module is configured to receive a scan signal from the one of the plurality of scan lines, receive a data signal from the one of the plurality of data lines under the control of the scan signal, and transmitted the data signal to the first driving module, the second driving module, the third driving module, and the fourth driving module.

9. The display device of claim 8, wherein the first driving module comprises a first control transistor, the second driving module comprises a second control transistor, the third driving module comprises a third control transistor, and the fourth driving module comprises a fourth control transistor; and a control terminal of the first control transistor is electrically connected to the signal receiving module, a first terminal of the first control transistor is electrically connected to a driving voltage terminal, and a second terminal of the first control transistor is electrically connected to the first light-emitting module; a control terminal of the second control transistor is electrically connected to the signal receiving module, a first terminal of the second control transistor is electrically connected to the driving voltage terminal, and a second terminal of the second control transistor is electrically connected to the second light-emitting module; a control terminal of the third control transistor is electrically connected to the signal receiving module, a first terminal of the third control transistor is electrically connected to the driving voltage terminal, and a second terminal of the third control transistor is electrically connected to the third light-emitting module; and a control terminal of the fourth control transistor is electrically connected to the signal receiving module, a first terminal of the fourth control transistor is electrically connected to the driving voltage terminal, and a second terminal of the fourth control transistor is electrically connected to the fourth light-emitting module.

10. The display device of claim 7, wherein the first light-emitting module, the second light-emitting module, the third light-emitting module, and the fourth light-emitting module are arranged in an array, the first light-emitting module and the second light-emitting module are arranged along a first direction, and the first light-emitting module and the third light-emitting module are arranged along a second direction, the first direction being perpendicular to the second direction.

11. The display device of claim 10, wherein among the plurality of pixel units with the first mixed brightness, a pixel unit in which the first light-emitting module has a brightness greater than the preset brightness and remaining light-emitting modules each have a brightness less than the preset brightness is set to correspond to a sequence 1; a pixel unit in which the second light-emitting module has a brightness greater than the preset brightness and remaining light-emitting modules each have a brightness less than the preset brightness is set to correspond to a sequence 2; a pixel unit in which the third light-emitting module has a brightness greater than the preset brightness and remaining light-emitting modules each with have a brightness less than the preset brightness is set to correspond to a sequence 3; and a pixel unit in which the fourth light-emitting module have a brightness greater than the preset brightness and remaining light-emitting modules each have a brightness less than the preset brightness is set to correspond to a sequence 4;

among the plurality of pixel units with the second mixed brightness, a pixel unit in which the first light-emitting module and the second light-emitting module each have a brightness greater than the preset brightness and remaining light-emitting modules each have a brightness less than the preset brightness is set to correspond to a sequence 1; a pixel unit in which the first light-emitting module and the fourth light-emitting module each have a brightness greater than a preset brightness and remaining light-emitting modules each have a brightness less than the preset brightness is set to correspond to a sequence 2; a pixel unit in which the first light-emitting module and the third light-emitting module each have a brightness greater than a preset brightness and remaining light-emitting modules each have a brightness less than the preset brightness is set to correspond to a sequence 3; a pixel unit in which the second light-emitting module and the third light-emitting module each have a brightness greater than a preset brightness and remaining light-emitting modules each have a brightness less than the preset brightness is set to correspond to a sequence 4; a pixel unit in which the second light-emitting module and the fourth light-emitting module each have a brightness greater than a preset brightness and remaining light-emitting modules each have a brightness less than the preset brightness is set to correspond to a sequence 5; and a pixel unit in which the third light-emitting module and the fourth light-emitting module each have a brightness greater than a preset brightness and remaining light-emitting modules each have a brightness less than the preset brightness is set to correspond to a sequence 6;

among the plurality of pixel units with the third mixed brightness, a pixel unit in which the first light-emitting module have a brightness less than a preset brightness and remaining light-emitting modules each have a brightness greater than the preset brightness is set to correspond to a sequence 1; a pixel unit in which the second light-emitting module have a brightness less than the preset brightness and remaining light-emitting modules each have a brightness greater than the preset brightness is set to correspond to a sequence 2; a pixel unit in which the third light-emitting module has a brightness less than the preset brightness and remaining light-emitting modules each have a brightness greater than the preset brightness is set to correspond to a sequence 3; and a pixel unit in which the fourth light-emitting module has a brightness less than a preset brightness and remaining light-emitting modules each have a brightness greater than a preset brightness is set to correspond to a sequence 4;

before each frame of image is displayed, any one of the sequence 1 to the sequence 6 is randomly output to control pixel units corresponding to the same sequence to execute image display.

12. The display device of claim 7, wherein the plurality of pixel units are disposed in a display region of the display panel; the display panel further comprises, in a non-display region of the display panel, a timing control circuit for driving the plurality of pixel units to execute image display, a data driving circuit, and a scan driving circuit; the display panel further comprises a plurality of data lines and a plurality of scan lines;

the timing control circuit is electrically connected to the data driving circuit and configured to control timing of the data driving circuit and the scan driving circuit;

the data driving circuit is electrically connected to the plurality of data lines and is configured to transmit data signals for display to the plurality of pixel units through the plurality of data lines; and the scan driving circuit is electrically connected to the plurality of scan lines and is configured to output scan signals through the plurality of scan lines to control when the plurality of pixel units receive the data signals.

* * * * *